United States Patent Office 2,857,564
Patented Oct. 21, 1958

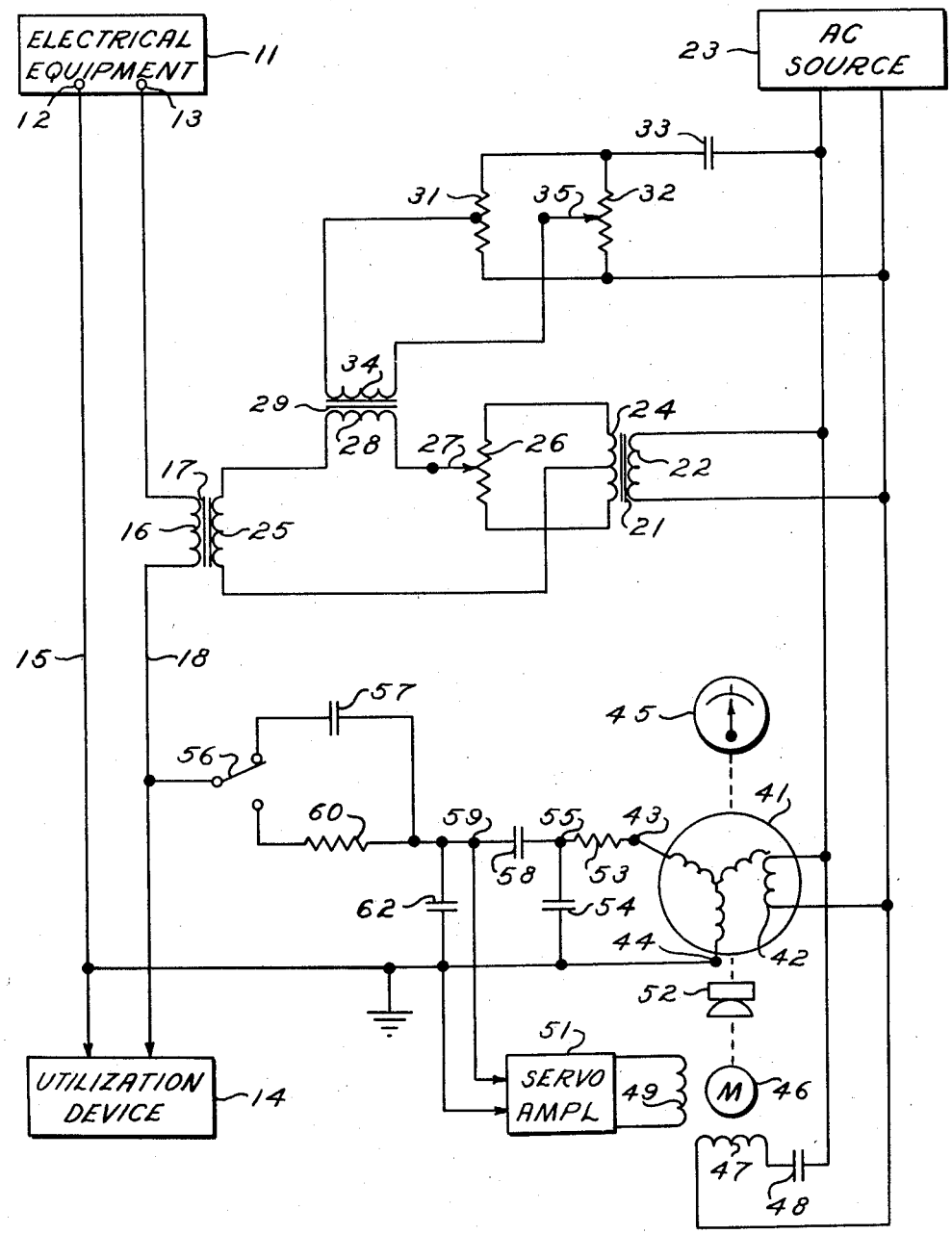

2,857,564

VOLTAGE BALANCING SYSTEM

John W. Gray, Pleasantville, N. Y., assignor to General Precision Laboratory Incorporated, a corporation of New York Application July 25, 1956, Serial No. 600,142

7 Claims. (Cl. 323—45)

This invention relates to apparatus for making the voltage between two conductors equal to zero and for determining when such voltage is zero.

Let it be supposed that a piece of electronic equipment has two output terminals between which there exists an alternating voltage which may be derived from any of many various circuit configurations within the equipment. Many practical cases arise where it is desired to subtract, from the voltage of such terminals, an equal voltage so as to obtain an output equal to zero. For example, the voltage of the terminals may be a control voltage and it may be desired to have some control action initiated when the voltage of the terminals deviates from a predetermined reference voltage. In such a case a network can be provided to subtract a voltage equal to the reference voltage, whereupon the output voltage of the network is nominally zero but will depart from zero and have either a positive or negative phase when the voltage of the terminals rises or falls from that of the predetermined reference.

It would appear offhand that the problem of subtracting any desired voltage from a pair of conductors would be very simple. For example, a resistor connected to an auxiliary adjustable source of voltage could be connected in parallel with one of the conductors. Or, the secondary of a transformer could be connected in series with one conductor and the primary connected to an auxiliary adjustable voltage source. In either case, an alternating current voltmeter could be used to indicate when the output voltage had been reduced to zero. However, an attempt to utilize one of these simple expedients soon reveals its shortcomings when a high degree of accuracy is required.

It has been found that the circuits often encountered in electronic equipment, such as booster amplifiers, for example, frequently introduce a phase shift so that the voltage at the terminals of the equipment is not in phase with the line voltage. Consequently, if the auxiliary voltage source is the line voltage, no amount of adjustment of the magnitude of the voltage introduced by a resistor or transformer can completely offset the voltage of the terminals. Furthermore, the inherent capacitative and inductive coupling of wiring and cabling often causes voltages in phase quadrature to the line voltage to be induced in the conductors with a like deleterious effect. Another difficulty is that the phase of the residuary voltage is not indicated by an ordinary A.-C. voltmeter.

It is an object of the present invention to provide apparatus for adding a voltage of proper magnitude and phase to the voltage of two terminals so that the resultant voltage is zero.

Another object of this invention is to provide apparatus for detecting the presence of voltages either in phase or in quadrature with a reference voltage.

In accordance with the invention, first and second voltages, each of adjustable magnitude, and in phase and in quadrature respectively with the line voltage, are added to the voltage which is to be nullified. The null condition is detected with the aid of a rotatable transformer the primary winding of which is connected to the line voltage. The voltage of the secondary winding is first compared with the inphase component of the voltage to be nullified and the resultant voltage, which constitutes an error signal, is led to a servo amplifier which controls a motor connected to the shaft of the rotatable transformer. The first voltage is then adjusted until the motor drives the transformer to that position at which no voltage is induced in the secondary, which position is shown by a pointer. The voltage of the secondary is next compared with that of the quadrature component and the second voltage adjusted until a null is reached as indicated by the pointer.

For a clearer understanding of the invention reference may be made to the following detailed description and the accompanying drawing the single figure of which is a schematic diagram of the invention.

Referring now to the drawing, there is shown a piece of electrical equipment having two terminals 12 and 13 across which there normally exists a constant alternating voltage. It is desired to modify this voltage by adding algebraically a voltage of equal magnitude and opposite phase so that the resultant can be passed to a utilization device 14. The terminal 12 is connected to the device 14 by means of a conductor 15 while the terminal 13 is connected through a secondary 16 of a transformer 17 to the conductor 18 and then to the utilization device 14.

A transformer 21 has its primary winding 22 connected to a source 23 of alternating current. The secondary 24 of transformer 21 has its center tap connected to one terminal of the secondary 25 of the transformer 17 while the extremities of secondary 24 are connected across a potentiometer 26. The slider 27 of potentiometer 26 is connected through the secondary winding 28 of a transformer 29 to the other terminal of the secondary winding 25. Disregarding for the moment the action of transformer 29, it can be seen that, by adjustment of the slider 27, a voltage of adjustable magnitude which is either in phase or 180° out of phase with the source 23 may be impressed on the secondary 25 of transformer 17 and thereby added to the potential of terminal 13.

A center tapped resistor 31 and a potentiometer 32 are connected in parallel with each other and through a capacitor 33 to the alternating current source 23. The center tap of resistor 31 is connected to one terminal of the secondary 34 of transformer 29 and the slider 35 of potentiometer 32 is connected to the other terminal of secondary winding 34. It can be seen that by adjustment of the slider 35 a potential can be impressed across the primary winding 34 which is either 90° or 270° out of phase with the voltage of source 23. This voltage is added by means of transformer 29 to the potential of slider 27 so that the voltage induced in winding 16 of transformer 17 can be selected to have any desired phase and magnitude. By properly adjusting sliders 27 and 35 any voltage on terminals 12 and 13 can be balanced out.

The next problem is that of determining when the potential of terminals 12 and 13 has been balanced out. An alternating current voltmeter could be connected across conductors 15 and 18 and the sliders 27 and 35 adjusted until this voltage was zero. However, this might be a laborious process since the voltmeter would not indicate whether the inphase component or the quadrature component required adjustment. It would therefore be desirable to provide apparatus for indicating the presence of inphase and quadrature components separately. Ideally such apparatus should be sensitive to only one of these components and entirely unresponsive to the other component. The apparatus about to be described closely approaches this ideal condition.

A transformer 41 having relatively rotatable primary and secondary windings has its primary winding 42 connected to the alternating current source 23. One type of rotatable transformer which has been found satisfactory is a miniature synchro transmitter and this is the type of transformer shown in the drawing for illustrative purposes. Only two of the secondary terminals 43 and 44 are used. There is, of course, one relative position of the windings at which no voltage will appear between terminals 43 and 44 and this position is displayed by means of an indicator 45. The rotor of the transformer 41 is mechanically connected for rotation by a two-phase motor 46, one winding 47 of which is connected through a capacitor 48 to the alternating current source 23 while the other winding 49 is energized by a servo amplifier 51 which rotates the motor until the input voltage is zero. In this particular application, we are concerned only with those positions of the transformer 41 which are close to its reference position and therefore the transformer may be provided with mechanical stops, a few degrees on each side of the reference position and a slip clutch 52 may be included in the mechanical connection between the motor and the rotatable transformer 41.

When the transformer 41 is in any position other than this reference position, a voltage will appear across terminals 43 and 44 and this voltage will be slightly out of phase with the voltage of the source 23. A phase shifting network comprising a series resistor 53 and a shunt capacitor 54 is connected across the terminals 43 and 44 so that the voltage at the junction 55 is substantially in phase with the voltage of the source 23. The junction 55 is connected to the junction 59 through a capacitor 58 and a capacitor 62 is connected between the junction 59 and the common or ground conductor which in turn is connected to the conductor 15 and the terminal 44.

The conductor 18 is connected to the movable arm of a two position switch 56 to enable the inphase and quadrature components to be balanced out separately. When the switch 56 is in its upper position as shown in the drawing, the conductor 18 is connected through a capacitor 57 to the junction 59. If the transformer 41 is in its reference position, the potential of junction 59 due to the transformer voltage will, of course, be zero. Any potential on junction 59 will be due solely to the potential of conductor 18, reduced in magnitude by the voltage divider action of capacitors 57 and 62. This voltage is applied to the servoamplifier 51 and, if it contains a component in phase with the voltage of source 23, the motor 46 will be driven and the transformer 41 rotated. The voltage of transformer 41 will be in such a direction as to oppose the voltage of junction 59 due to the voltage of conductor 18 and the motor will continue to rotate the transformer 41 until the voltage at junction 59 is zero. In order to reduce the inphase component of the voltage of conductor 18 to zero, the slider 27 is adjusted until the motor 46 drives the transformer 41 to its reference position. Obviously this can occur only if the inphase component of the voltage of conductor 18 is zero.

When the switch 56 is in its lower position, the conductor 18 is connected through a resistor 60 to the junction 59. If the transformer 41 is again assumed to be in its reference position, the voltage at junction 59 will be the voltage drop across capacitor 62 which is in series with resistor 60. The values of resistor 60 and capacitor 62 are selected so that the voltage drop across capacitor 62 is nearly 90° out of phase with the voltage between conductors 15 and 18. This means that if the voltage of conductor 18 has a quadrature component, it will cause a voltage to appear on junction 59 which has a component in phase with the source 23 and this voltage will drive the motor 46 and rotate the transformer 41. As before, the voltage of transformer 41 will be in such a direction as to oppose the voltage at junction 59 due to conductor 18 and when the voltage at junction 59 has been reduced to zero the motor will stop. The quadrature component of conductor 18 may now be balanced out by adjusting the slider 35 of the potentiometer 32 until the motor 46 drives the transformer 41 to its reference position and stops there. Since, at the reference position, the voltage of transformer 41 will be zero, the motor can only stop if the quadrature component on conductor 18 is also zero.

The balancing of the inphase and quadrature components is not entirely independent as above described, since the adjustment of sliders 27 and 35 do affect each other somewhat. However, the adjustments are nearly independent and very few trimming adjustments are necessary. When sliders 27 and 35 are adjusted properly, the transformer 41 should remain at its reference position for either position of the switch 56.

The various resistors and capacitors in the network between conductors 15 and 18 and the transformer 41 should be selected to secure the best operation. One set of values which has been found to be satisfactory for use with 400 cycle alternating current is as follows:

Resistor 53 .................................... 4700 ohms.
Resistor 60 .................................... 140,000 ohms.
Capacitor 54 ................................... 0.01 μf.
Capacitor 57 ................................... 0.0033 μf.
Capacitor 58 ................................... 10 μμf.
Capacitor 62 ................................... 0.02 μf.

Although the invention has been described with respect to a specific embodiment many modifications may be made within the scope of the invention. For example, the inphase and quadrature components from sliders 27 and 35 could be added to conductor 18 by means of two transformers each in series with conductor 18 or by means of a single transformer having one winding in series with conductor 18 and two additional windings, one connected to each of the sliders. Many other modifications will occur to those skilled in the art.

What is claimed is:

1. Apparatus for indicating the respective inphase and quadrature relationship between a reference voltage and a utilization voltage comprising, a transformer having relatively rotatable primary and secondary windings, one of said windings being energized by said reference voltage, means for selectively comparing the voltage induced in the other of said windings with said utilization voltage and with the quadrature shifted utilization voltage producing therefrom first and second comparison voltages, means operated by said comparison voltages for rotating said transformer windings relative to each other, and means for indicating the relative position of said windings.

2. Apparatus for indicating the respective inphase and quadrature relationships between a reference voltage and a utilization voltage comprising, a transformer having relatively rotatable primary and secondary windings, one of said windings being energized by said reference voltage, means for selectively comparing the voltage induced in the other of said windings with said utilization voltage shifted in phase by approximately ninety degrees and with said utilization voltage unshifted whereby first and second comparison voltages are produced, a servomechanism having said first and second comparison voltages selectively impressed on the input thereof and its output connected to produce relative rotation between said transformer windings, and means for indicating the relative position of said windings.

3. Apparatus for indicating the condition of zero voltage between two conductors comprising, a transformer having relatively rotatable primary and secondary windings, means for energizing said primary winding from a source of alternating current, means for establishing a reference position of said windings at which no voltage is induced in said secondary winding, a servomechanism for relatively rotating said windings in response to an input voltage, first circuit means for comparing the voltage of said secondary winding with that component of the voltage of said conductors which is in phase with said source, second circuit means for comparing the voltage of said secondary winding with that component of the voltage of said conductors which is in quadrature with said source, and means for selectively energizing said servomechanism with the voltage resulting from either said first circuit means or said second circuit means.

4. Apparatus for indicating the respective inphase and quadrature relationship between a reference voltage and a utilization voltage comprising, a transformer having its primary winding energized by said reference voltage, motive means for producing relative rotation between the primary and secondary windings of said transformer, phase shifting means connected to said secondary winding to produce an output voltage from the voltage induced in said secondary winding whose phase is equal to that of said reference voltage, circuit means for comparing said utilization voltage with said secondary output voltage to produce a first comparison voltage, circuit means including quadrature phase shifting means for comparing the quadrature shifted utilization voltage with said secondary output voltage to produce a second comparison voltage, a servoamplifier, means for selectively applying said first and second comparison voltages to the input of said servoamplifier, means operating said motive means by the output of said servoamplifier, and means for indicating the relative position of the primary and secondary windings of said transformer.

5. Apparatus for separately detecting the presence, across a pair of conductors, of first and second voltages which are in phase and in quadrature respectively with a reference voltage comprising, a rotatable transformer having its primary energized by said reference voltage, a first phase shifting network for shifting the phase of the voltage of the secondary of said transformer to equal that of said reference voltage, a reversible motor connected to the shaft of said rotatable transformer, a servoamplifier for controlling said motor, a second phase shifting network for shifting the phase of the voltage on said conductors by approximately ninety degrees, means for selecting a first or second input for connection to said servoamplifier, said first input being the difference in voltage between that of said conductors and that of said first phase shifting network and said second input being the difference in voltage between the outputs of said first and second phase shifting networks.

6. Apparatus for adding to the voltage of a pair of terminals an equal but opposite voltage so that the resulting voltage on a pair of conductors is zero comprising, a transformer having relatively rotatable primary and secondary windings, means for energizing said primary winding from a source of alternating current, means for establishing a reference position of said windings at which no voltage is induced in said secondary winding, a servomechanism for relatively rotating said windings in response to an input voltage, first circuit means for comparing the voltage of said secondary winding with that component of the voltage on said conductors which is in phase with said source, second circuit means for comparing the voltage of said secondary winding with that component of the voltage on said conductors which is in quadrature with said source, means for selectively energizing said servomechanism with the voltage resulting from either said first circuit means or said second circuit means, means for adding to said terminals first and second balancing voltages each of adjustable magnitude in phase and in quadrature respectively with said source and impressing the resultant on said conductors whereby said balancing voltages may be adjusted until said servomechanism rotates said windings to said reference position when energized by the voltage resulting from either of said circuit means.

7. Apparatus for adding to the voltage of a pair of terminals an equal but opposite voltage so that the resulting voltage on a pair of conductors is equal to zero comprising, a transformer having relatively rotatable primary and secondary windings, means for energizing said primary winding from a source of reference voltage, a servomechanism for producing relative rotation between said windings in response to an input voltage, means for indicating a reference position which is that relative position of said windings at which no voltage is induced in said secondary winding by said primary winding, first circuit means for comparing the voltage induced in said secondary winding with the voltage on said conductors and for energizing said servomechanism with the resulting voltage, means for adding to the voltage of said terminals a first incremental voltage in phase with said reference voltage of such magnitude that said servomechanism rotates said windings to said reference position, phase shifting means connected to said conductors for shifting the phase of the voltage by approximately ninety degrees, second circuit means for comparing the voltage of said secondary winding with the output of said phase shifting means and for energizing said servomechanism with the resulting voltage, means for adding to the voltage of said terminals a second incremental voltage in phase quadrature with said reference voltage of such magnitude that said servomechanism rotates said windings to said reference position, and means for selectively connecting for operation either said first circuit means or said second circuit means.

References Cited in the file of this patent
UNITED STATES PATENTS

| 2,330,427 | Hornfeck | Sept. 28, 1943 |
| 2,627,598 | Browder et al. | Feb. 3, 1953 |